(12) United States Patent  
Kemppinen

(10) Patent No.: US 8,004,574 B2  
(45) Date of Patent: Aug. 23, 2011

(54) PORTABLE ELECTRONIC DEVICES WITH PICTURE IN PICTURE CAPABILITY

(75) Inventor: Pasi Kemppinen, Tampere (FI)

(73) Assignee: Nokia Corporation, Espoo (FI)

( * ) Notice: Subject to any disclaimer, the term of this patent is extended or adjusted under 35 U.S.C. 154(b) by 1288 days.

(21) Appl. No.: 10/896,147

(22) Filed: Jul. 21, 2004

(65) Prior Publication Data

US 2006/0017832 A1    Jan. 26, 2006

(51) Int. Cl.
*H04N 5/225* (2006.01)
*H04N 5/222* (2006.01)

(52) U.S. Cl. .............. 348/220.1; 348/333.05

(58) Field of Classification Search .......... 348/220.1, 348/333.05
See application file for complete search history.

(56) References Cited

U.S. PATENT DOCUMENTS

| | | | | |
|---|---|---|---|---|
| 6,181,381 B1 * | 1/2001 | Evans | ...................... | 348/333.01 |
| 6,359,649 B1 * | 3/2002 | Suzuki | ....................... | 348/220.1 |
| 6,424,843 B1 | 7/2002 | Reitmaa et al. | | |
| 6,559,881 B1 | 5/2003 | Vooi-Kia et al. | | |
| 6,961,083 B2 * | 11/2005 | Obrador et al. | ............ | 348/220.1 |
| 7,394,485 B2 * | 7/2008 | Kim | ........................... | 348/220.1 |
| 7,405,751 B2 * | 7/2008 | Lee et al. | ................... | 348/220.1 |
| 2001/0040636 A1 * | 11/2001 | Kato et al. | ............... | 348/333.03 |
| 2003/0117501 A1 | 6/2003 | Shirakawa | | |
| 2003/0194207 A1 * | 10/2003 | Chung et al. | .................... | 386/52 |
| 2008/0098295 A1 * | 4/2008 | Nelson et al. | ................. | 715/233 |

FOREIGN PATENT DOCUMENTS

| | | |
|---|---|---|
| EP | 0 930 770 A2 | 7/1999 |
| EP | 1 420 568 A1 | 5/2004 |
| JP | H11-69214 A | 2/1999 |
| JP | H11-252197 A | 9/1999 |
| JP | 2003-274263 A | 9/2003 |
| JP | 2004-180107 A | 6/2004 |
| WO | WO 01/31892 A1 | 5/2001 |
| WO | WO 01/31893 A1 | 5/2001 |
| WO | WO 2004/015986 A1 | 2/2004 |
| WO | WO 2004/030374 A1 | 4/2004 |

* cited by examiner

*Primary Examiner* — James M Hannett
(74) *Attorney, Agent, or Firm* — Harrington & Smith

(57) ABSTRACT

A system and method for simultaneously capturing multiple pictures or videos on an electronic device. In a preferred embodiment of the invention, the electronic device includes a first camera and a second camera. The first camera is capable of taking a first picture, while the second camera is capable of taking a second picture. The first picture and the second picture may be simultaneously displayed in a "picture in picture" format on the display screen, stored into memory of the electronic device or transmitted to a remote location.

46 Claims, 5 Drawing Sheets

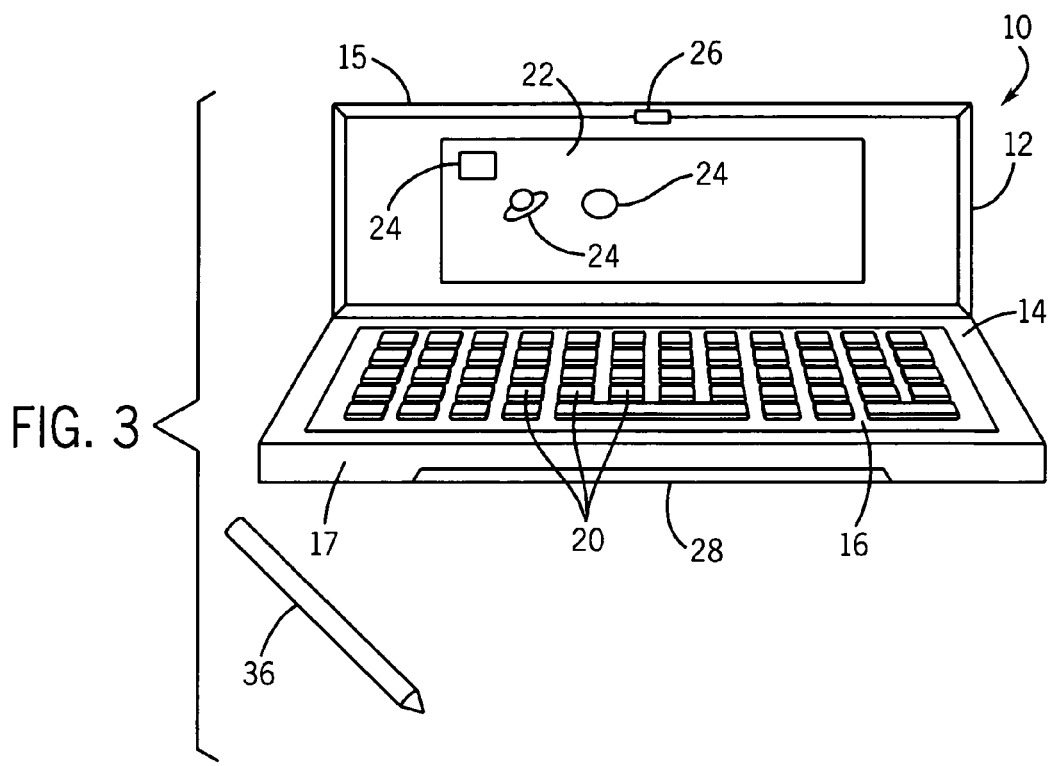
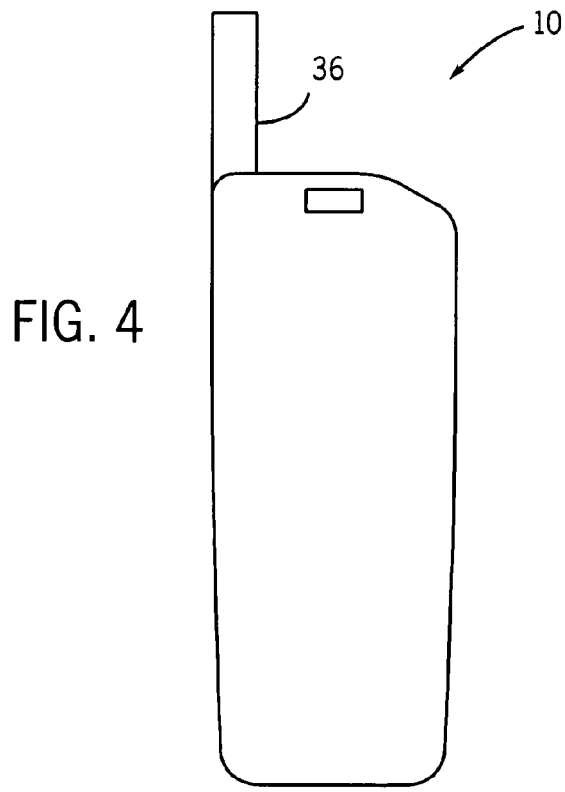

PORTABLE ELECTRONIC DEVICES WITH PICTURE IN PICTURE CAPABILITY

FIELD OF THE INVENTION

The present invention relates generally to portable electronic devices. More particularly, the present invention relates to portable electronic devices incorporating picture- or video-taking capabilities therein.

BACKGROUND OF THE INVENTION

In recent years, a wide variety of features have been incorporated into portable electronic devices. For example, products have recently appeared in the marketplace that incorporate telephones, personal computers, personal digital assistants (PDA's), digital cameras, video cameras, and other items into a single device. One such device is shown and described in U.S. Pat. No. 6,424,843, issued to Nokia oyj and incorporated herein by reference. Another such product is marketed by Nokia under the COMMUNICATOR trademark.

At the same time that these portable electronic devices have become more wide-ranging in their capabilities, users have simultaneously become increasingly demanding as to the features they would like to see in these products. For example, the business traveler does not want to have to carry a portable telephone, a personal digital assistant, and a small personal computer while in transit. Instead, the business traveler would prefer to have all of these features incorporated into a single device. The same phenomenon has also occurred with individuals purchasing these devices for their own personal use. Furthermore, people using these devices for personal use have also shown a desire for additional features relating to the "camera" feature of the device. In recent years, the incorporation of a camera on a portable telephone has exploded in popularity, which has also led to people expecting new features for use with the camera.

SUMMARY OF THE INVENTION

In accordance with the principles of the present invention, there is provided a portable electronic device, preferably in the form of a portable telephone with camera capabilities. The portable electronic device includes the capability of taking multiple pictures. The portable electronic device includes the capability of displaying two such pictures at the same time on a single display in a preferred embodiment of the invention. The pictures can be displayed in a "picture in picture" format.

These and other objects, advantages and features of the invention, together with the organization and manner of operation thereof, will become apparent from the following detailed description when taken in conjunction with the accompanying drawings, wherein like elements have like numerals throughout the drawings described below.

BRIEF DESCRIPTION OF THE DRAWINGS

FIG. 3 is a view showing the inside of the portable electronic device of FIG. 2 when in the open position;

FIG. 4 is a rear view of the outer casing of the portable electronic device of FIG. 2;

DETAILED DESCRIPTION OF THE INVENTION

Figure 1:
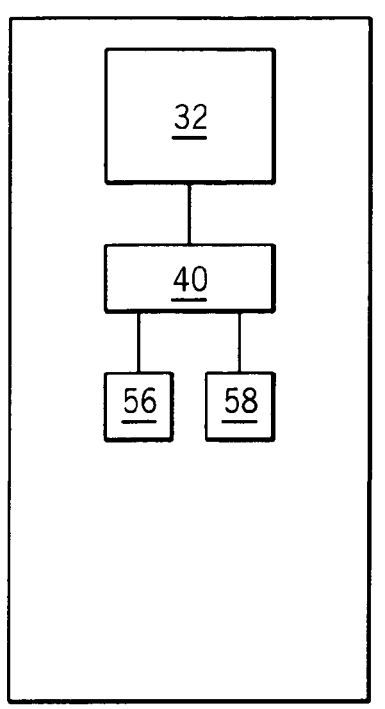
FIG. 1 is a perspective view of a generic device including the features of the present invention.

FIG. 1 generically discloses a device 80 including the relevant features of the present invention. The device 80 includes a display screen 32, a processor 40, a first camera 58 and a second camera 56. The processor 40 is operatively connected to the display screen 32, the first camera 58 and the second camera 56. As is discussed herein, the first camera 58 and the second camera 56 are capable of independently collecting images which can be simultaneously displayed on the display screen 32.

Figure 2:
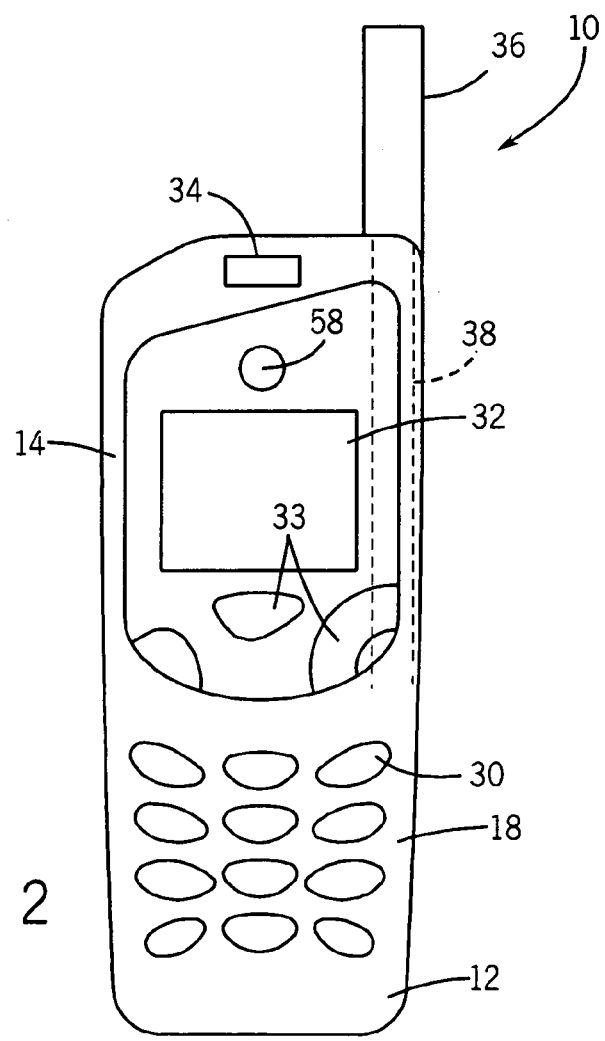
FIG. 2 shows a front view of the outer casing of a portable electronic device constructed according to one embodiment of the present invention.

FIGS. 2-4 show the structure of a portable electronic device 10 constructed according to one particular embodiment of the present invention. The principles of the present invention are not limited to the type of device of FIGS. 2-4, however, and can be applied to a wide variety of portable electronic devices, including but not limited to portable telephones, hand-held computers, digital cameras, camcorders, personal digital assistants and combinations thereof. The portable electronic device 10 shown in FIGS. 2-4 is a combination of a cellular telephone, hand-held computer, and a personal digital assistant. One such portable electronic device is a device marketed and sold by Nokia under the COMMUNICATOR brand name, and includes features such as a telephone, data and Internet connectivity, word processors, spreadsheets, presentation editors, viewers and a variety of office tools, as well as including various security features and also including items such as a VGA camera, video recorder and other items. However, none of these features are required in a device constructed in accordance with the principles of the present invention.

The portable electronic device 10 of FIGS. 2-4 includes a housing 12 that is foldable along a hinge element 14. The housing 12 includes a housing inner portion 16 and a housing outer portion 18, as well as a housing upper portion 15 and a housing lower portion 17. As shown in FIG. 3, the housing inner portion 16 may include items such as keyboard keys 20, as well as a touch-sensitive display 22. The touch-sensitive display 22 can display various icons 24, as well as text, numbers, images, and other items. The housing inner portion 16 also preferably includes male and female latching members 26 and 28 that are used to keep the portable electronic device 10 in a closed position, when items found in the housing inner portion 16 are not in use. However, a wide variety of mechanisms besides male and female latching members 26 and 28 may also be used. For example, it is also possible to include a magnetic system for keeping the housing upper portion 15 and the housing lower portion 17 engaged with each other. The present invention is also applicable to "monoblock" devices, such as a device similar to the device shown in FIGS. 2 and 4 but without including any sort of hinging mechanism. It should therefore be understood that the present invention is not limited by a particular type of mechanical construction, and that a module incorporating the principles of the present invention can be used in conjunction with a wide variety of electronic devices.

As shown in FIG. 2, the housing outer portion 18, in an exemplary embodiment of the invention, comprises a telephone system which includes a plurality of telephone keys 30 and a display screen 32. The display screen 32 can either be strictly for display purposes or can also be touch-sensitive. The outer housing portion 18 also includes a speaker 34 to emit various sounds, as well as the voice of a person during a telephone conversation. A data input device 36, in the form of a stylus or other object, fits within a data input device storage region 38. The data input device storage region 38, in one exemplary embodiment of the invention, comprises a slot inside a portion of the housing 12. It is also possible, however, that the data input device storage region 38 could take the form of a securing mechanism on the outside of the housing 12 against which the data input device 36 could be secured using one of a variety of methods known in the art.

As shown in FIG. 3, the data input device 36 is used to manipulate items on the touch-sensitive display 22. In particular, the data input device 36 can be used to actuate icons 24 on the touch-sensitive display 22 in order to initiate various commands, open computer programs, and perform other functions. It is also possible for the data input device 36 to interact with the touch-sensitive display 22 to perform functions such as dragging items across the touch-sensitive display 22, editing text, enlarging or resizing objects, and performing many functions that are similar to those that a user can perform using a mouse with a personal computer.

As shown in FIG. 2, the portable electronic device 10 also includes a first camera 58. The first camera 58, in an exemplary embodiment of the invention, is capable of taking digital photographs, which can then be displayed on the portable electronic device 10, saved into an internal memory, and/or transmitted to a remote location by one of several methods, including as an attachment to a piece of electronic mail or through a wired connection such as a USB connection. The photograph could also be transmitted as an attachment to a voice message in one particular embodiment of the invention. In an alternative embodiment of the invention, at least one of the first camera 58 and the second camera 56 could also, instead of providing a still digital photograph, be used to capture video for display, storage or transmission. In the case of capturing video, this system can be extremely useful in applications such as video conferencing, where both still and video images can be immediately transmitted to a remote terminal.

As shown in FIG. 2, a second camera 56 is also operatively connected to the housing 12 of the portable electronic device 10. Like the first camera 58, the second camera 56, in an exemplary embodiment of the invention, is capable of taking digital photographs, which can then be displayed on the portable electronic device 10, saved into an internal memory, and/or transmitted to a remote location by one of several methods, including as an attachment to a piece of electronic mail or through a wired connection such as a USB connection. These photographs can be captured by the second device 56 at substantially the same time as photographs are being captured by the first camera 58. The photograph could also be transmitted as an attachment to a voice message in one particular embodiment of the invention. In an alternative embodiment of the invention, the second camera 56 could also, instead of providing a still digital photograph, be used to capture video for display, storage or transmission, and all references to a first picture 60 and a second picture 62 should be interpreted to encompass video as well. Both the first picture 60 and the second picture 62 are taken, according to one embodiment of the invention, by using a plurality of input buttons 33 located below the display screen shown in FIG. 2.

In a preferred embodiment of the invention, both the first camera 58 and the second camera 56 are fixedly secured to the portable electronic device 10. However, it is also possible that one or both of the first and second cameras 58 and 56 are fixedly secured to the portable electronic device 10. In an alternative embodiment of the present invention, at least one of the first camera 58 and the second camera 56 may be removable. Furthermore, according to yet another embodiment of the present invention, at least one of the first camera 58 and the second camera 56 may be fixed to the portable electronic device 10 by a securing mechanism (not shown) which makes it possible to aim that particular camera independently from the portable electronic device 10.

Figure 6:
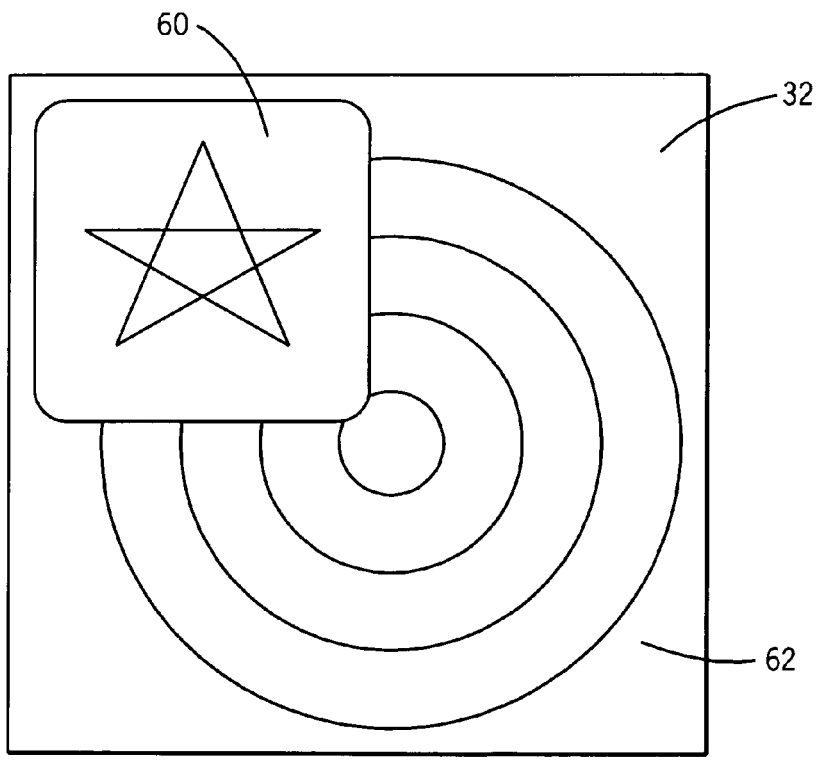
FIG. 6 is a view of the display screen of the portable electronic device of FIG. 2, showing pictures from both the first camera and the second camera being displayed simultaneously.

As shown in FIG. 6, the display screen 32 is used to display the first picture 60, which is generated by the first camera 58 of FIG. 2, and the second picture 62, which is generated by the second camera 56 of FIG. 4. It should be understood that it is also possible display only a portion of the first picture 60 and/or the second picture, and that the description herein should be interpreted to also include this ability. In an exemplary embodiment of the invention, the display screen 32 is also used to display text messages, telephone numbers, and other items, although a separate screen could also be used. As is clearly shown in FIG. 6, the display screen 32 is capable of displaying both the first picture 60 and the second picture 62 at the same time in a "picture in picture" format. This feature enables a user to view and or send multiple images on a single screen. Both the first picture 60 and the second picture 62 may be taken, according to one embodiment of the invention, by using a plurality of input buttons 33 located below the display screen shown in FIG. 2. In an alternative embodiment of the invention, the command to take at least one picture may be initiated by voice command or via a remote device. Furthermore, in referring to a first picture 60 and a second picture 62, it should be noted that at least one of these images could also be in the form of video and are is not limited to still photographs.

In an exemplary embodiment of the invention, the second camera 56 is located on the housing outer portion 18 substantially opposite the portion of the housing 12 that includes the telephone component of the portable electronic device 10, as shown in FIG. 4. By positioning the second camera 56 in this position, the user is capable of taking a picture or video of an object in front of him or her while simultaneously being able to view the resulting first picture 60. Additionally, the first camera 58 is positioned in the portion of the outer housing 12 closer to the telephone component of the portable electronic device 10, and preferably, the second camera 56 is capable of being aimed substantially independent of the first camera 58. In this particular embodiment of the invention, the positioning of the first camera 58 allows a user to take a picture or video of himself or herself, while at the same time take a separate picture or video of another object.

In addition to the features described above, the user can also have the capability of manipulating both the first picture 60 and the second picture 62 in various embodiments of the present invention. For example but without limitation, the user may be able to move the position of the first picture 60 from one corner of the display screen 32 to another corner or, if desired, towards the center of the display screen 32. This feature could be used if a user wished to move the first picture 60 to a portion of the display screen 32 so that a particularly interesting portion of the second picture 62 could be seen.

Additionally, the first picture 60 could also be enlarged, reduced, or otherwise resized in the display screen as desired. Furthermore, a user could also "switch" the first picture 60 and the second picture 62, such that the second picture 62 is significantly smaller than the first picture 60. In such a situation, the user could also resize and/or move the second picture 62 in substantially the same manner as is discussed for the first picture 60 above. In another embodiment of the invention, the user could, instead of using a "picture in picture" format, create a "split screen" showing the first picture 60 next to, above or below the second picture 62 or could alter the positioning such that the first picture 60 and the second picture 62 only partially overlap.

Figure 5:
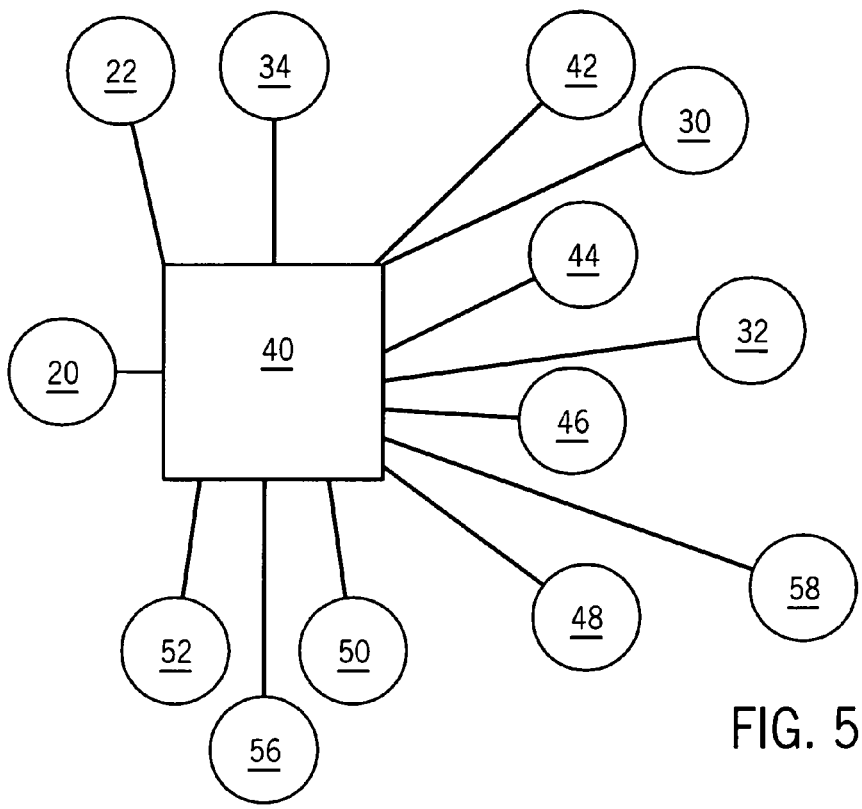
FIG. 5 is a structural diagram showing the arrangement of multiple cameras in a portable electronic device constructed according to one embodiment of the present invention.

FIG. 5 is a structural diagram showing the key functional elements of the portable electronic device 10 of FIGS. 2-4. As shown in FIG. 5, a processor 40 processes the information that is received from a variety of sources, including, but not limited to, the touch-sensitive display 22, the telephone keys 30, the data input device 36, the keyboard keys 20, and other items such as a data communication link 46 and a telephone link 48. Various combinations of these items and others may also be operatively connected to the processor 40. In this particular embodiment of the invention, a data input device sensor 42 and a latching member sensor 44 may also be operatively connected to the processor 40, with the data input device sensor 42 determining whether the stylus 36 is located within the data input device storage region 38 and whether the male latching member 26 and the female latching member 28 are engaged with each other. The processor 40 may also be operatively connected to such output devices as a vibrator 50 and or a display in the form of a light 52, as well as other potential output devices. Additionally, both the first camera 58 and the second camera 56 are operatively connected to the processor 40. The processor 40 can include an integral memory unit or can be operatively connected to a separate memory (not shown).

Figure 7:
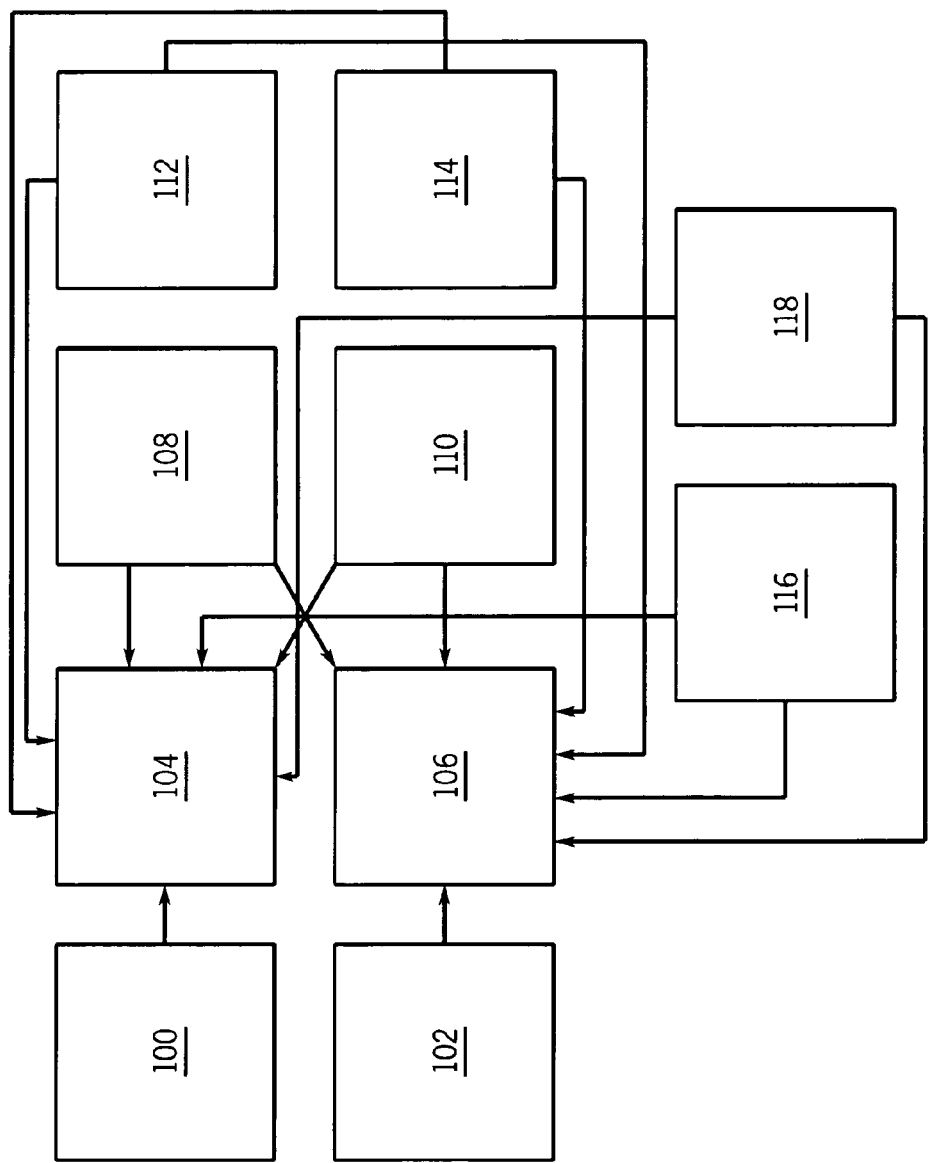
FIG. 7 is a functional flow diagram showing the process of generating and displaying multiple pictures from different cameras according to the system of FIG. 5.

FIG. 7 is a flow diagram demonstrating the process involved for taking and displaying both the first picture 60 and the second picture 62 on the display screen 32 according to one embodiment of the present invention. It should be noted, however, a variety of different processes could be used for taking and displaying the first picture 60 and the second picture 62, and those skilled in the art would understand these processes.

As shown in FIG. 7, the process of the user taking and displaying both the first picture 60 and the second picture 62, begins with the user placing an input command for taking the first picture 60, represented at 100. At the same time, before or after step 100, the user places a command to take the second picture 62, represented at 102. In an alternative embodiment of the invention, the user needs to enter only a single input command, after which both the first picture 60 and the second picture 62 are captured. At steps 100 and 102, the first picture 60 and the second picture 62 are also respectively processed for subsequent use. The portable electronic device 10 then displays the first picture 60 on the display screen 32, represented at 104, as well as displaying the second picture 62 on the display screen 32, represented at 106. In an exemplary embodiment of the invention, there is a default setting for which of either the first picture 60 or the second picture 62 will be displayed in a smaller form. Alternatively, the first picture 60 and the second picture 62 can be stored in the memory of the device 80, or they can be transmitted to a remote terminal or otherwise further processed in a variety of manners. If the first picture 60 and the second picture 62 are transmitted to a remote terminal, this can be accomplished by connections including but not limited to WLAN, Bluetooth and "over the air" cellular connections or other connections known by those in the art.

According to one embodiment of the invention, once the first picture 60 and the second picture 62 have been displayed, the user is capable of entering a variety of different commands to alter both the first picture 60 and the second picture 62. For example and as shown in FIG. 6, the user can place commands to move the location of the first picture 60 and/or the second picture 62 on the display screen 32 (step 108); to enlarge the first picture 60 and/or the second picture 62 on the display screen 32 (step 110); to reduce the first picture 60 and/or the second picture 62 on the display screen 32 (step 112); to resize the shape of the first picture 60 and/or the second picture 62 on the display screen 32 (step 114); to adjust the picture quality of the first picture 60 or the second picture 62 on the display screen 32 (step 116); and to "flip" the positions and sizes of the first picture 60 and the second picture 62 (step 118). Other manipulations of the first picture 60 and the second picture 62 could also be accomplished by the user, as understood by those skilled in the art. All of the above steps can be accomplished through the use of a computer software program or product that includes computer code for performing the various steps.

The manipulation of the first picture 60 and the second picture 62, according to one embodiment of the invention, is accomplished using the plurality of input buttons 33. However, a variety of mechanisms could be used to accomplish this manipulation, including the use of an "eraser-type" mouse (not shown) of the type used on many laptop computers, as well as touch-sensitive pads or options on a touch-sensitive display.

Figure 8:
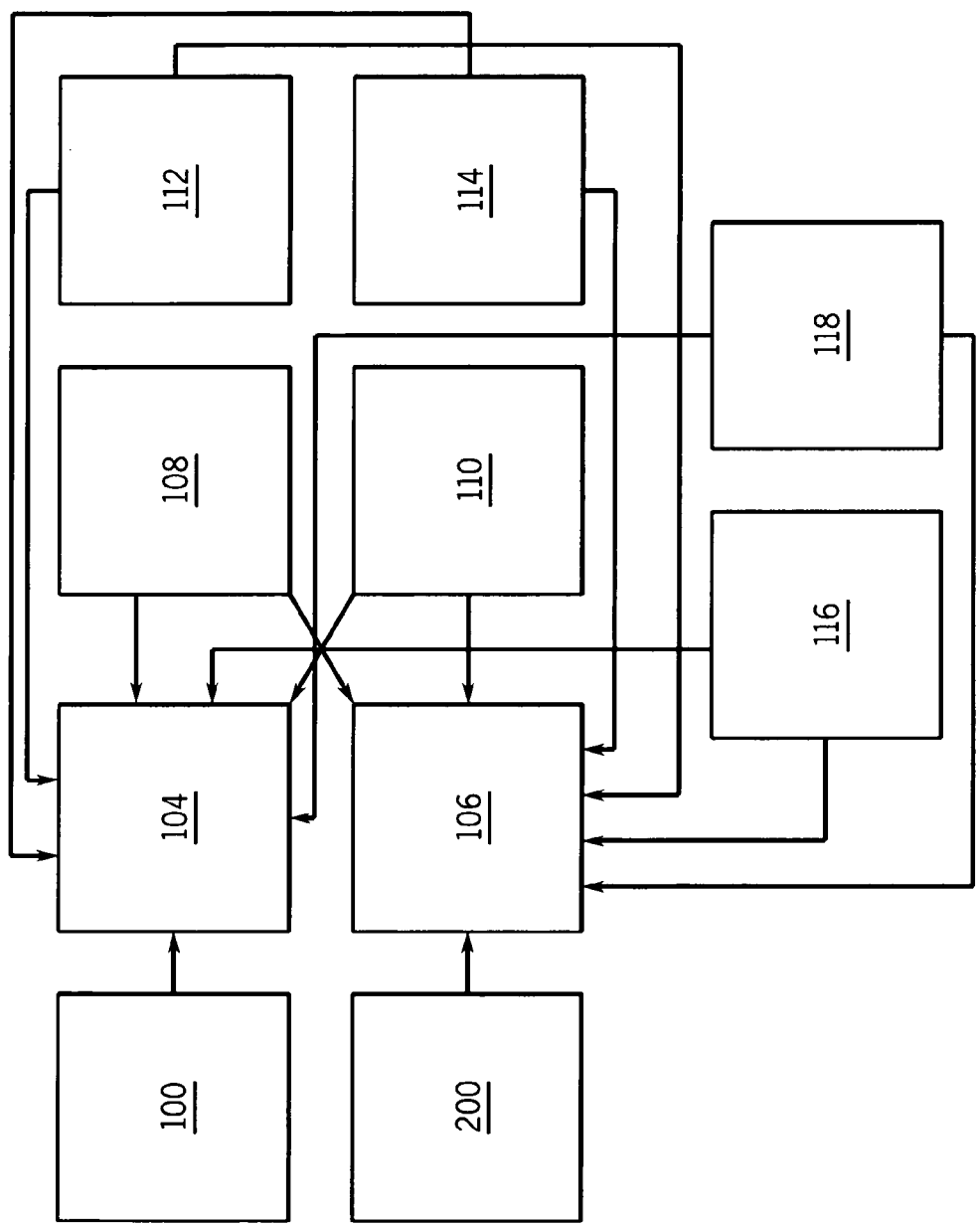
FIG. 8 is a functional flow diagram showing the process of generating and displaying multiple pictures from a single camera according to an alternate embodiment of the present invention.

An alternate embodiment of the invention is shown and described in FIG. 8. In this alternate embodiment, a single camera is used to take both the first picture 60 and the second picture 62. In this alternate embodiment, and as in the embodiment depicted in FIG. 7, the user places an input command for taking the first picture 60, represented at 100. However, instead of using a separate camera, the user subsequently places an input command for the same camera to take the second picture 62, represented at 200. The other steps involved in this process are substantially identical to the process outlined in FIG. 7.

While several preferred embodiments have been shown and described, it is understood that changes and modifications can be made to the invention without departing from the invention's broader aspects. For example and as mentioned above, a module incorporating the present invention can be include in a wide variety of electronic devices and is not to be limited to a camera phone or any other particular mechanical implementation. It is also possible that more than two cameras could be used, and more than two images could be displayed on a single display. It should also be noted that it not necessary that the same device both capture the images at issue and display them. For example, a portable electronic device could display a pair of images that are sent to it via email or a similar method. Various features of the present invention are described and defined in the following claims.

What is claimed is:

1. A method, comprising:
controlling a touch sensitive display to simultaneously display a first image and a second image, wherein the second image is smaller than the first image and the second image is displayed in picture-in-picture format relative to the first image;

enabling a user to manipulate the first image, while the second image is smaller than the first image and is displayed in picture-in-picture format relative to the first image; and enabling the user to manipulate the second image, using the touch sensitive display, while the second image is smaller than the first image and is displayed in picture-in-picture format relative to the first image.

2. The method of claim 1, wherein at least one of the first and second images comprise a still photograph.

3. The method of claim 1, wherein the first image is a video image and the second image is a video image.

4. The method of claim 1, further comprising storing the first image and the second image on an electronic device.

5. The method of claim 1, further comprising: causing the second image to be transmitted to a remote location.

6. The method of claim 1, wherein:
enabling the user to manipulate the second image using the touch sensitive display comprises enabling the user to alter a position of the second image using the touch sensitive display without altering a position of the first image displayed on the touch sensitive display.

7. The method of claim 1, wherein:
enabling the user to manipulate the first image, displayed on the touch sensitive display comprises enabling the user to resize the first image, displayed on the touch sensitive display, without resizing the second image displayed on the touch sensitive display; and enabling the user to manipulate the second image using the touch sensitive display comprises enabling the user to resize the second image using the touch sensitive display without resizing the first image on the touch sensitive display.

8. The method of claim 1, wherein the first image and the second image are captured substantially simultaneously.

9. The method of claim 8, wherein the first image is captured by a first camera and the second image is captured by a second camera.

10. The method of claim 1, wherein the first image and the second image are still photographs.

11. The method of claim 1, wherein the first image is a video image and the second image is a video image.

12. The method of claim 11, further comprising: causing the second video image to be transmitted to a remote location.

13. The method of claim 12, wherein the second video image is transmitted to the remote location for video conferencing.

14. A computer program product, embodied on a computer readable medium, comprising computer code that, when executed by at least one processor, causes an apparatus to:
control a touch sensitive display to simultaneously display a first image and a second image, wherein the second image is smaller than the first image and the second image is displayed in picture-in-picture format relative to the first image;

enable a user to manipulate the first image, while the second image is smaller than the first image and is displayed in picture-in-picture format relative to the first image; and enable the user to manipulate the second image, using the touch sensitive display, while the second image is smaller than the first image and is displayed in picture-in-picture format relative to the first image.

15. The computer program product of claim 14, wherein at least one of the first and second images comprise a still photograph.

16. The computer program product of claim 14, wherein the first image is a video image and the second image is a video image.

17. The computer program product of claim 14, further comprising computer code that, when executed by the at least one processor, causes second image to be transmitted from the apparatus to a remote terminal.

18. The computer program product of claim 14, further comprising computer code that, when executed by the at least one processor, causes the apparatus to store the first image and the second image.

19. The computer program product of claim 14, further comprising computer code that, when executed by the at least one processor, causes the apparatus to:
enable the user to manipulate the second image using the touch sensitive display, by enabling the user to alter a position of the second image using the touch sensitive display without altering a position of the first image displayed on the touch sensitive display.

20. The computer program product of claim 14, further comprising computer code that, when executed by the at least one processor, causes the apparatus to:
enable the user to manipulate the first image, displayed on the touch sensitive display, by enabling the user to resize the first image displayed on the touch sensitive display without resizing the second image displayed on the touch sensitive display; and enable the user to manipulate the second image using the touch sensitive display by enabling the user to resize the second image using the touch sensitive display without resizing the first image displayed on the touch sensitive display.

21. The computer program product of claim 14, wherein the computer code, when executed by the at least one processor, causes the apparatus to capture the first image and the second image substantially simultaneously.

22. The computer program product of claim 21, wherein the computer code, when executed by the at least one processor, causes the apparatus to capture the first image using a first camera and to capture the second image using a second camera.

23. The computer program product of claim 14, wherein the first image and the second image are still photographs.

24. The computer program product of claim 14, wherein the first image is a video image and the second image is a video image.

25. The computer program product of claim 24, wherein the computer code, when executed by the at least one processor, causes the second video image to be transmitted to a remote location.

26. The computer program product of claim 25, wherein the second video image is transmitted from the apparatus to the remote location for video conferencing.

27. An apparatus, comprising:
at least one processor; and
at least one memory storing computer program code;
the at least one memory and the computer program code configured to, working with the at least one processor, cause the apparatus to:
control a touch sensitive display to simultaneously display a first image and a second image, wherein the second image is smaller than the first image and the second image is displayed in picture-in-picture format relative to the first image;

enable a user to manipulate the first image, while the second image is smaller than the first image and is displayed in picture-in-picture format relative to the first image; and enable the user to manipulate the second image; using the touch sensitive display, while the second image is smaller than the first image and is displayed in picture-in-picture format relative to the first image.

28. The apparatus of claim 27, wherein the computer code is configured to, working with the at least one processor, cause the apparatus to:

enable the user to manipulate the second image using the touch sensitive display, by enabling the user to alter a position of the second image using the touch sensitive display without altering a position of the first image displayed on the touch sensitive display.

29. The apparatus of claim 27, wherein the computer code is configured to, working with the at least one processor, cause the apparatus to:

enable the user to manipulate the first image, displayed on the touch sensitive display, by enabling the user to resize the first image displayed on the touch sensitive display without resizing the second image displayed on the touch sensitive display; and enable the user to manipulate the second image using the touch sensitive display, by enabling the user to resize the second image using the touch sensitive display without resizing the first image displayed on the touch sensitive display.

30. The apparatus of claim 27, wherein the computer code is configured to, working with the at least one processor, cause the apparatus to capture the first image and the second image substantially simultaneously.

31. The apparatus of claim 30, wherein the computer code is configured to, working with the at least one processor, cause the apparatus to capture the first image by a first camera and the second image by a second camera.

32. The apparatus of claim 27, wherein the first image and the second image are still photographs.

33. The apparatus of claim 27, wherein the first image is a video image and the second image is a video image.

34. The apparatus of claim 33, wherein the computer code is configured to, working with the at least one processor, cause the second video image to be transmitted to a remote location.

35. The apparatus of claim 34, wherein the second video image is transmitted from the apparatus to the remote location for video conferencing.

36. The apparatus of claim 27, further comprising the touch sensitive display.

37. A method, comprising:

controlling a touch sensitive display to simultaneously display a first video image and a second video image, wherein the second video image is smaller than the first video image and the second video image is displayed in picture-in-picture format relative to the first video image;

enabling a user to manipulate the first video image, while the second video image is smaller than the first video image and is displayed in picture-in-picture format relative to the first video image; and enabling the user to alter a position of the second video image using the touch sensitive display, without altering a position of the first video image, while the second video image is smaller than the first video image and is displayed in picture-in-picture format relative to the first video image.

38. The method of claim 37, further comprising: enabling reception of the first video image from a remote location; causing a camera to obtain the second video image; and causing the second video image to be transmitted to the remote location.

39. The method of claim 38, wherein the first video image is for video conferencing and the second video image is transmitted for video conferencing.

40. A computer program product, embodied on a computer readable medium, comprising computer code that, when executed by at least one processor, causes an apparatus to:

control a touch sensitive display to simultaneously display a first video image and a second video image, wherein the second video image is smaller than the first video image and the second video image is displayed in picture-in-picture format relative to the first video image;

enable a user to manipulate the first video image, while the second video image is smaller than the first video image and is displayed in picture-in-picture format relative to the first video image; and enable the user to alter a position of the second video image using the touch sensitive display, without altering a position of the first video image, while the second video image is smaller than the first video image and is displayed in picture-in-picture format relative to the first video image.

41. The computer program product of claim 40, wherein the computer code, when executed by the at least one processor, causes the apparatus to: enable reception of the first video image from a remote location; cause a camera to obtain the second video image; and cause the second video image to be transmitted from the apparatus to the remote location.

42. The computer program product of claim 41, wherein the first video image is received at the apparatus for video conferencing and the second video image is transmitted for video conferencing.

43. An apparatus, comprising:

at least one processor; and at least one memory storing computer program code;

the at least one memory and the computer program code configured to, working with the at least one processor, cause the apparatus to:

control a touch sensitive display to simultaneously display a first video image and a second video image, wherein the second video image is smaller than the first video image and the second video image is displayed in picture-in-picture format relative to the first video image;

enable a user to manipulate the first video image, while the second video image is smaller than the first video image and is displayed in picture-in-picture format relative to the first video image; and enable the user to alter a position of the second video image using the touch sensitive display without altering a position of the first video image, while the second video image is smaller than the first video image and is displayed in picture-in-picture format relative to the first video image.

44. The apparatus of claim 43, wherein the computer code is configured, working with the at least one processor, cause the apparatus to: enable reception of the first video image from a remote location; cause a camera to obtain the second video image; and cause the second video image to be transmitted from the apparatus to the remote location.

45. The apparatus of claim 44, wherein the first video image is received at the apparatus for video conferencing and the second video image is transmitted from the apparatus for video conferencing.

46. The apparatus of claim 43, further comprising the touch sensitive display.

* * * * *